Feb. 23, 1932.  R. THOMSON  1,846,502
GAUGE
Filed June 19, 1929
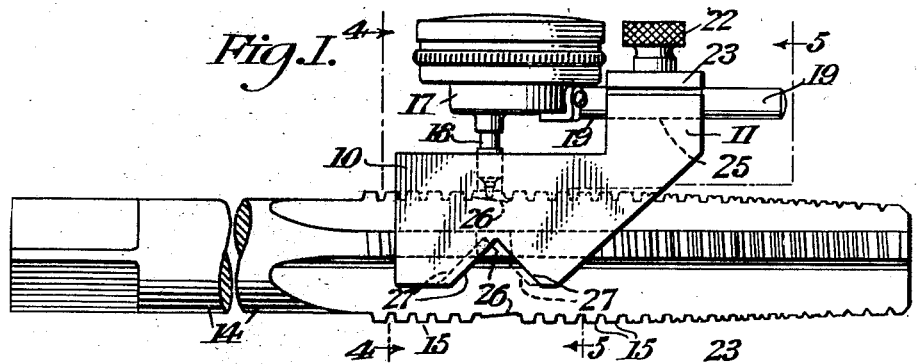
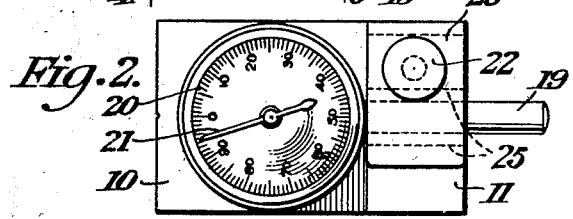
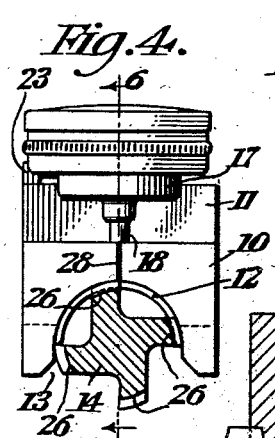
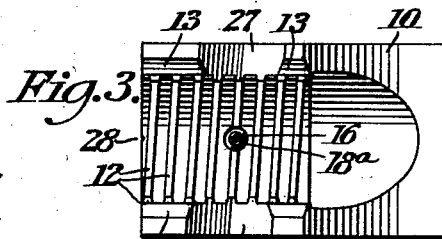
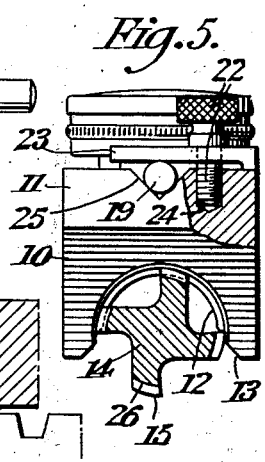
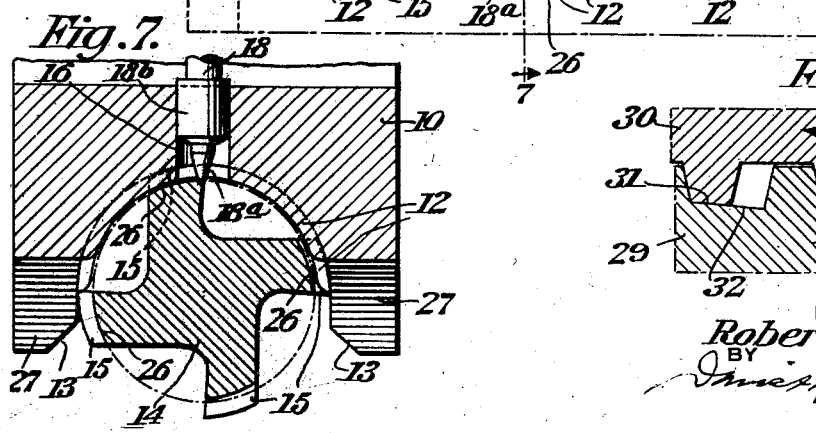
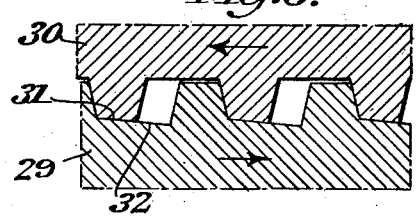
INVENTOR
Robert Thomson
BY
ATTORNEYS Patented Feb. 23, 1932

1,846,502

UNITED STATES PATENT OFFICE

ROBERT THOMSON, OF NEWARK, NEW JERSEY, ASSIGNOR TO DARDELET THREADLOCK CORPORATION, OF NEW YORK, N. Y., A CORPORATION OF DELAWARE

GAUGE

Application filed June 19, 1929. Serial No. 372,048.

This invention relates to improvements in gauges, and has for its object to provide a simple and efficient device for determining whether or not manufactured articles conform to predetermined standard measurements, and for indicating the extent of the differences, if any, between the measured dimensions of the articles and the standard dimension or dimensions.

The invention is especially designed to accomplish gauging the size of threaded articles at points in the path of the thread groove and is especially applicable to gauging the nut thread rib crest trimming cutting portions of taps, such, for example, as the tap shown in the accompanying drawings and forming the subject matter of my copending application, Serial No. 364,565, filed May 20, 1929.

Another object of the invention is to provide a gauge for tap or other screw threads, of simple and inexpensive construction and which will permit easy and rapid testing of taps or other threaded articles.

To the foregoing and other ends, which will hereinafter appear, the invention consists of the features of construction, arrangements of parts, and combinations of elements particularly pointed out in the appended claims, and more fully hereinafter described.

The preferred embodiment of the invention is illustrated in the accompanying drawings, in which:

Fig. 1 is a side elevation of the gauge in operative or measuring relation with a tap of the kind shown in the co-pending application above referred to;

Fig. 2 a top plan view of the gauge;

Fig. 3 a bottom plan view of the gauge;

Fig. 4 a section on the line 4—4 of Fig. 1;

Fig. 5 a section on the line 5—5 of Fig. 1;

Fig. 6 a fragmentary section on an enlarged scale taken on the line 6—6 of Fig. 4;

Fig. 7 an enlarged fragmentary sectional view on the line 7—7 of Fig. 6; and

Fig. 8 a fragmentary longitudinal sectional view showing the threads of a Dardelet nut and bolt in frictionally locked relation.

The gauge shown is of the hand or portable type, and comprises generally a base block or positioning member adapted to be grasped by the hand and measuring or variation indicating means of the spring-pressed plunger actuated type carried by the base member.

The base block 10 has the form of a half nut with the concave threaded face of the nut segment at the bottom, and said block is formed at one end with an upstanding extension 11. The portions of the thread rib 12 of the female thread on the base block preferably extend through 180 degrees, as shown, and the sides of the block preferably depend below the threaded surface portion of the block and are beveled at their inner faces as shown at 13 to facilitate passing the block downward over a tap, i. e. transversely of the axis of the tap, while the tap 14 is held at its ends in a grinding machine, to fit the rib-portions of the female thread on the block in the groove of the tap thread.

The sides of the rib 12 of the base thread are designed to abut the sides of the rib 15 of the tap thread, but the groove of the base thread is made of substantially less depth than the groove of the tap thread on the cylindrical or non-tapered inner or finishing portion of the tap, as more clearly shown in Figs. 4 to 7. The base block may thus be seated only upon the tops of adjacent turns of the tap thread rib and, since the sides of the base thread abut the sides of the tap thread, the base can not be axially displaced while on the tap except by a screwing adjustment or travel of the base on the tap at the pitch rate.

A suitable measuring device is mounted on the base block having a tap surface contacting portion disposed to engage the tap along the path of the tap thread groove. In the embodiment shown, the base block is formed with a cylindrical passage or bore 16 extending vertically entirely therethrough with its axial line passing through the center or medial line of the crest of one of the half-turn portions of the rib 12 of the base block thread, preferably one of those rib portions about midway the ends of the base block thread, as shown. The measuring or variation indicating device consists of an ordinary dial indicator gauge of the spring-pressed plunger actuated type, more fully shown and described in patent to Reisner, No. 1,419,306, dated June 13, 1922, with a slightly modified form of plunger head.

This indicator comprises a rotatively adjustable dial 20, a casing 17 on which the dial is supported, a spring pressed plunger 18 reciprocably mounted in the casing and projecting downward therefrom, a pointer 21 in the casing geared to the plunger for rotation over the dial by endwise movement of the plunger 18, and a horizontally extending bracket rod 19 rigidly secured at one end to the casing 17. In the present construction the plunger is formed with a pointed lower end portion $18^a$ adapted to enter the thread groove of the tap and an enlarged and relatively long cylindrical guiding portion $18^b$ above said pointed end having a sliding fit in bore 16 of the base block to insure movement of the plunger perpendicular to the axis of the tap. A clamping screw 22 passes loosely through a clamping plate 23 and is screwed into a threaded socket 24 in the top of the base block.

Bracket rod 19 lies in a V-shaped groove 25 in the top of extension 11 of the base block, and plate 23 extends over and is held pressed firmly down on top of the rod by clamping screw 22, to rigidly but detachably hold the indicating device to the base block.

The contact point $18^a$ of the plunger is normally projected downward beyond the crest of that portion of thread rib 12 of the base block which crosses bore 16, at the medial line of the crest, so that when the base block is applied to the tap said contact point will always lie in the path of the medial line of the thread groove of the tap and will remain in such line when the block or the tap are turned about the axis of the tap. Successive measurements of the tap may thus be taken along this line without disengaging the base block from the tap.

In the tap shown, which is designed for threading Dardelet nuts, the thread of the tap is interrupted as usual by the tap flutes, and the thread groove is of such depth that the tap does not touch or cut the metal across the top or crest of the nut thread rib until the latter part of the tapping operation, at which time the crest of the rib is trimmed off at an angle of six degrees to the axis by four cutters 26, one on each land of the tap. These cutters 26 extend across the thread groove of the tap, and in the tap shown, are formed by grinding down the lands near the inner end of the tap through one turn of the tap at a point where the thread groove has not been cut full depth. It will be obvious that care must be taken not to grind the cutters 26 down too low and the primary object of the present invention is to provide a gauge for testing the dimensions of the cutters 26 and especially to provide a gauge which can be applied to a tap while in the grinding machine to periodically gauge the cutters and prevent excessive grinding.

As the effective portion of each cutter 26 is that which extends across the path of the tap thread groove it is preferable to measure this portion, and since contact point $18^a$ of plunger 18 projects down from the medial line of rib 12 of the base block thread it will be obvious that it will contact with the medial lines of the cutters 26 one after the other if the tap is turned after meshing of the tap and base block threads. To facilitate the gauging of a tap the sides of the base block are formed with V-shaped index notches 27 the apices of which register with the medial line of that rib portion 12 of the base block thread through which point $18^a$ projects, and one end of the base block is formed with an index groove 28 in the plane of the plunger axis. The notches permit the operator to readily mesh the base block with the tap at a point where plunger 18 is over the effective cutting portion of one of the wide cutters 26, e. g. the one nearest the entering end of the tap, after which the tap may be turned step by step to gauge the remaining three cutters. The groove 28 in coaction with the adjacent portion of a tap land permits the operator to readily tell when the contact point is pressing on the top of a cutter adjacent its leading or cutting edge, as shown in Figs. 4 and 7.

The usual practice is to make the first three cutters of increasing height and the fourth cutter the same height as the third. It will be obvious that by adjusting the dial to read "0" when the plunger is applied to the lowest cutter of a master tap and observing the readings for the other cutters of the master tap, the gauge may be used to compare the several cutter dimensions of the other taps and will indicate the amount of over or under size.

The Dardelet thread cut by the tap is shown in Fig. 8, in which 29 is the bolt, 30 the nut the tap is designed to thread, 31 the inclined locking surface at the crest of the nut thread rib cut by the cutters 26, and 32 the coactive inclined locking surface at the bottom of the bolt thread groove.

The gauge is not limited in use to gauging the cutters 26 but may be used for other purposes, for example, to gauge the depth of the thread groove of the tap at either side of the crest trimming portion of the tap.

What I claim is:

1. A gauge comprising a member ribbed and grooved at one face to seat without end play on the top portion only of the thread rib of an externally threaded member, and distance indicating means held to said member and having an actuating plunger movable transversely of the axis of a thread upon which the member is seated and extending through said member and projecting beyond the top of one of its ribs in the helical path of said rib.

2. A comparator comprising plunger actuated distance indicating means, and a support for said indicating means provided with means engageable with a male thread to position the indicating means in a predetermined radial and axial relation with the crest of the engaged thread with the contact head of its actuating plunger out of the helical path of the thread crest.

3. A gauge for threaded articles comprising a base grooved at one face to receive the top only of a male thread rib, and a plunger actuated distance indicating means rigidly held to said base with its actuating plunger positioned to move transversely of the axis of the male thread engaged with the grooves of the base and projecting beyond the grooved face of the base between adjacent grooves.

4. A gauge for threaded articles comprising a base grooved at one face to receive the top only of a male thread rib, and a plunger actuated distance indicating means rigidly held to said base with its actuating plunger positioned to move transversely of the axis of a male thread engaged with the grooves of the base and projecting beyond the grooved face of the base between adjacent grooves, the base being provided with means for indicating the circumferential relation between the contact head of the plunger and an article having a male thread engaged with the base.

5. A gauge for threaded articles comprising a base grooved at one face to receive the top only of a male thread rib, and a plunger actuated distance indicating means rigidly held to said base with its actuating plunger positioned to move transversely of the axis of a male thread engaged with the grooves of the base and projecting beyond the grooved face of the base between adjacent grooves, the base being provided with means for indicating the axial relation between the contact head of the plunger and an article having a male thread engaged with the base.

6. A gauge for threaded articles comprising a base grooved at one face to receive a male thread rib, and a plunger actuated distance indicating means rigidly held to said base with its actuating plunger positioned to move transversely of the base between turns of the male thread rib, the base being provided with means for indicating the circumferential and axial relations of the plunger to an article having a male thread engaged with the base.

7. A comparator for taps comprising a nut segment whose thread groove is of less depth than the thread rib of a tap measurable thereby, and plunger actuated variation indicating means rigidly held to said segment with its plunger extending through said segment between turns of the thread groove and the contact head of the plunger projecting beyond the grooved face of the nut segment.

8. A comparator comprising a nut segment, plunger-actuated distance indicating means having a casing located at the face of the segment opposite the threaded face, and means for detachably and rigidly holding the casing to the segment, the segment having a radial passage through which the actuating plunger of the indicating means extends and in which said plunger has a sliding fit, said plunger having a work contacting end projecting beyond the threaded face of the segment in the helical line of the rib of the segment thread.

9. A tap gauge comprising a dial indicator having a casing and a spring projected actuating plunger, and means for supporting and guiding said casing on a tap thread for travel therealong at the pitch rate of the thread with the contact end of the plunger in the helical path of the tap thread groove and the casing spaced a predetermined distance from the tap thread crest by said supporting and guiding means.

10. A tap gauge as claimed in claim 9, wherein the supporting and guiding means for the indicator casing comprises a member having a concave face curved through not more than 180 degrees and also having an outwardly flared entrance for facilitating seating of said face upon a tap, said concave face having ribs and grooves forming part of a screw thread and interfittable with a tap thread to space the indicator casing a predetermined distance radially from the crest of the tap thread with the indicator plunger perpendicular to the thread axis.

11. A depth variation indicating gauge for radially offset surfaces of threaded articles, having definite relations with the thread path, comprising a dial indicator having a casing and a work-contacting actuating member, and means upon which said indicator is fixedly mounted having portions for engaging the sides of the thread of the article to be gauged and positioning said means and the actuating member of the indicator for contacting different ones of the radially offset surfaces to be compared.

In testimony whereof I hereunto affix my signature.

ROBERT THOMSON.